United States Patent
Abbott et al.

(10) Patent No.: US 7,426,323 B2
(45) Date of Patent: Sep. 16, 2008

(54) DISPERSION MANAGEMENT IN BRANCHED OPTICAL NETWORKS

(75) Inventors: Stuart M. Abbott, Marlboro, NJ (US); Ekaterina A. Golovchenko, Colts Neck, NJ (US); Michael Vaa, Little Silver, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 11/350,265

(22) Filed: Feb. 8, 2006

(65) Prior Publication Data

US 2007/0183711 A1    Aug. 9, 2007

(51) Int. Cl.
  *G02B 6/28* (2006.01)
  *G02B 6/26* (2006.01)
  *G02B 6/02* (2006.01)

(52) U.S. Cl. .................... 385/24; 385/16; 385/123
(58) Field of Classification Search ............... None
   See application file for complete search history.

(56) References Cited

U.S. PATENT DOCUMENTS

| | | | |
|---|---|---|---|
| 5,361,319 A | | 11/1994 | Antos et al. |
| 5,559,920 A | * | 9/1996 | Chraplyvy et al. ........ 385/123 |
| 6,021,245 A | * | 2/2000 | Berger et al. ............. 385/123 |
| 6,538,788 B2 | * | 3/2003 | Franco et al. ............ 398/158 |
| 6,865,328 B2 | * | 3/2005 | Berkey et al. ........... 385/123 |
| 2004/0028319 A1 | * | 2/2004 | Ajgaonkar et al. ........ 385/16 |

OTHER PUBLICATIONS

J.X. Cai, et al., "1.28 Tb/s transmission over an installed non slope-matched undersea cable using RZ-OOK Formats", OSA Workshop on Optical Amplifiers and their Applications, San Francisco, Post deadline Paper OPDP2, Jun. 26-30, 2004 (3 pages).

A. Pilipetskii, et al., "Dispersion Map with Compensation at the Shore Spans for DPSK Transmission", Tyco Telecom Laboratory Notebook 0021, pp. 94-99 (6 pages).

International Search Report and Written Opinion issued in related International Patent Application No. PCT/US07/61849 dated Feb. 14, 2008 (9 pages).

* cited by examiner

*Primary Examiner*—Tina M Wong
(74) *Attorney, Agent, or Firm*—Grossman Tucker Perreault & Pfleger, PLLC

(57) ABSTRACT

Dispersion may be managed in a branched optical network by using transmission segments having a single period segment dispersion map. One or more of such segments may be coupled to network nodes such as terminals or branching units such that dispersion may be managed even when the network is reconfigured. In one embodiment, a single period segment dispersion map provides dispersion compensation at the ends of the segment. In another embodiment, a single period segment dispersion-map provides dispersion compensation at the middle of the segment.

26 Claims, 8 Drawing Sheets

DISPERSION MANAGEMENT IN BRANCHED OPTICAL NETWORKS

CROSS-REFERENCE TO RELATED APPLICATIONS

The present application is related to U.S. patent application Ser. No. 11/201,762 filed on Aug. 11, 2005 and entitled Dispersion Management in Optical Networks Using a Differential Phase Shift Keying Modulation Format, which claims the benefit of U.S. Provisional Application Ser. No. 60/600,621 filed Aug. 11, 2004, both of which are fully incorporated herein by reference.

TECHNICAL FIELD

The present invention relates to branched optical networks and more particularly, to dispersion management in a branched optical network.

BACKGROUND INFORMATION

The transmission of optical signals in an optical communication system may be limited by optical effects such as chromatic dispersion., Optical signals may be transmitted as pulses of light in an optical fiber. When light propagating within an optical fiber undergoes chromatic dispersion, the light is delayed within the optical fiber. The delay causes spreading of the light pulses, which may affect the performance of the system. The specific amount of dispersion that an optical signal undergoes varies depending upon the wavelength of the optical signal. The extent to which dispersion varies as a function of light wavelength is often referred to as dispersion slope. Various dispersion management techniques have been used to reduce dispersion and to manage dispersion slope by reducing dispersion at individual channel wavelengths. Dispersion management is particularly important in wavelength division multiplexed (WDM) optical communication systems transmitting multiple channels at multiple wavelengths.

One dispersion management technique involves dispersion mapping where optical fiber types are selected and arranged to manage the dispersion as a function of distance in the transmission segments of an optical communication system. One example of a transmission segment design mixes spans of non-zero dispersion-shifted fiber (NZDSF) with spans of dispersion compensation fiber (DCF) to realize periodic dispersion compensation over the length of the optical transmission segment. The length of each period in such periodic dispersion maps may be in the range of about 500-1000 km per period.

The use of such periodic dispersion maps to manage dispersion in branched optical networks presents problems. A branched optical network may include a plurality of network nodes such as terminals and/or branching units and transmission segments coupled to the network nodes. One complication in the design of a branched optical network using the standard periodic dispersion map is the difficulty in satisfying the requirements for periodic dispersion compensation. Another problem is the limit on accumulated dispersion along all fiber paths for every digital line section (i.e., full fiber path) through the branched network. Changing a branching unit location in a periodic dispersion map design, for example, can result in serious changes to the transmission line design and/or production plan in order to comply with periodicity requirements. Alternatively, the periodicity requirements may be compromised to allow implementation of changes necessary to meet cost and schedule considerations. The periodicity requirements and accumulated dispersion also present problems when networks implement fiber switching or dynamic reconfiguration of channel routing at the branching units.

Accordingly, there is a need for dispersion management in a branched optical network that facilitates changing or reconfiguring the branched network.

BRIEF DESCRIPTION OF THE DRAWINGS

These and other features and advantages of the present invention will be better understood by reading the following detailed description, taken together with the drawings wherein.

DETAILED DESCRIPTION

Figure 1:
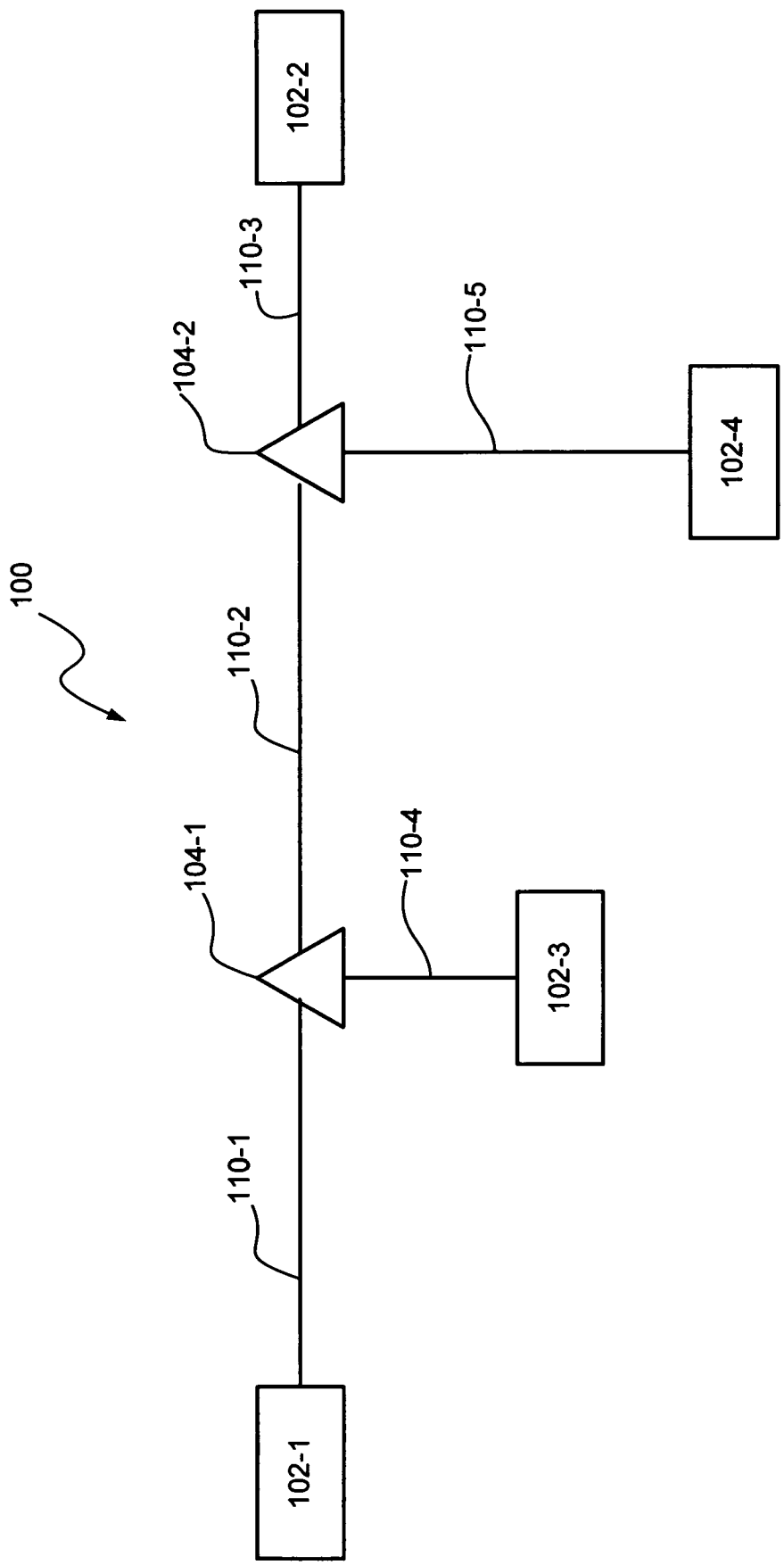
FIG. 1 is a schematic diagram of a branched optical network including transmission segments, consistent with one embodiment of the present invention.

Referring to FIG. 1, a branched optical network 100, consistent with one embodiment of the present invention, may be designed to manage dispersion in a manner that accommodates changes in the network 100. The branched optical network 100 may include a plurality of network nodes, such as one or more terminals 102-1 to 102-4 and one or more branching units 104-1 to 104-2, and a plurality of transmission segments 110-1 to 110-6. Each of the transmission segments 110-1 to 110-6 provides an optical path between two of the network nodes of the branched optical network 100. In one example, the branched optical network 100 may be a long-haul branched network in an undersea optical communication system. It is to be understood that dispersion management techniques consistent with the invention may be incorporated into a wide variety of network components and configurations. The illustrated exemplary embodiments herein are provided only by way of explanation, not of limitation.

The terminals 102-1 to 102-4 may be transmitter and/or receiver terminals that transmit and/or receive optical signals in multiple channels, for example, using wavelength division multiplexing (WDM) techniques. The terminals 102-1 to 102-4 may use dispersion-tolerant transmission formats, such as differential phase shift keying (DPSK) modulation. In DPSK modulation formats, ones and zeros are indicated by differential phase transitions. As used herein, DPSK modulation formats also include variations of DPSK modulation including, but not limited to, differential binary phase shift keying (DBPSK) modulation, differential quarternary phase shift keying (DQPSK), Return-to-Zero DPSK (RZ-DPSK), and Chirped-Return-to-Zero DPSK (CRZ-DPSK). Those skilled in the art will also recognize that other transmission formats may also be used including, but not limited to, on/off keying (OOK) modulation and duobinary modulation. The terminals may be implemented using equipment known to those skilled in the art.

Each of the branching units 104-1 to 104-2 may be a fixed branching unit or a reconfigurable branching unit. A branching unit 104-1, 104-2 may provide full fiber transfer, for example, where all signals on an input fiber are connected to the same output fiber. Alternatively, a branching unit 104-1, 104-2 may provide some form of partial capacity transfer, for example, using an optical add/drop multiplexer (OADM). The branching units may be implemented using equipment known to those skilled in the art.

Each of the transmission segments 110-1 to 110-5 may include, but is not limited to, cables including optical fiber, repeaters including optical amplifiers, and filters. The transmission segments may be constructed using techniques known to those skilled in the art. In the exemplary embodiments, the transmission segments 110-1 to 110-5 are bi-directional and the terminals 102-1 to 102-4 transmit optical signals in both directions through the segments 110-1 to 110-5. Alternatively, one or more of the segments may be unidirectional. Together the segments 110-1 to 110-5 provide various optical paths for data transmission, either with or without optical amplifiers to maintain optical signal level. For example, one optical path may be provided from terminal 102-1 through segments 110-1, 110-2 and 110-5 to terminal 102-4. Another optical path may be provided from terminal 102-1 through segments 110-1 and 110-4 to terminal 102-3. A further optical path may be provided from terminal 102-2 through segments 110-3, 110-2, and 110-1 to terminal 102-1.

Each of the transmission segments 110-1 to 110-5 may be designed using at least two different fiber types providing a single period segment dispersion map, as will be described in greater detail below. Each of the transmission segments 110-1 to 110-5 may also provide relatively low net dispersion at the channel wavelengths, for example, by designing the transmission segments 110-1 to 110-5 with a zero or minimum dispersion wavelength within or near the range of wavelengths used by the channels. To provide minimum accumulated dispersion in one embodiment of the branched optical network 100, the minimum dispersion wavelength ($\lambda_0$) may be at or near the center of the band of channels (e.g., at 1550 nm). In other embodiments of the network 100 (e.g., using some DPSK systems), however, having the minimum dispersion wavelength ($\lambda_0$-too close to a channel may cause impairments. According to one alternative embodiment using a DPSK modulation format, performance may be optimized by configuring the dispersion map so that the system has a negative average dispersion with the minimum dispersion wavelength ($\lambda_0$) outside of the signal band, as described in U.S. patent application Ser. No. 11/201,762, incorporated herein by reference.

Figure 2:
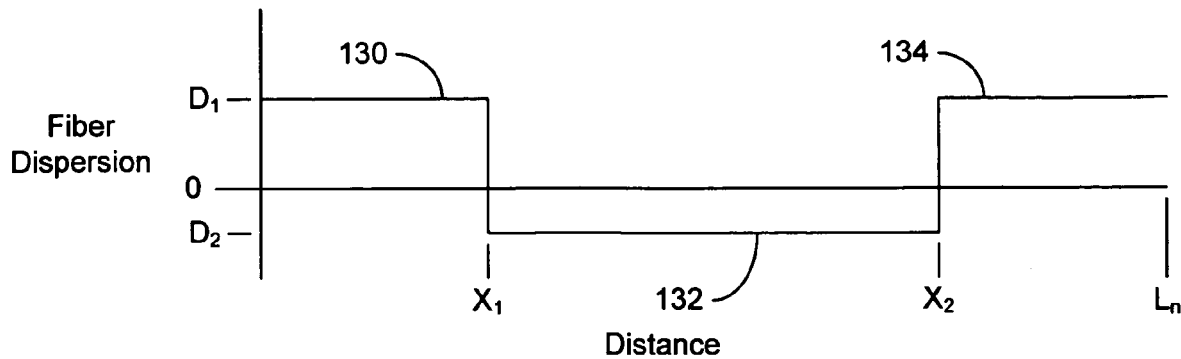
FIG. 2 is a graph illustrating the dispersion in a transmission segment having dispersion compensation in the ends of the segment, consistent with one embodiment of the present invention.
Figure 3:
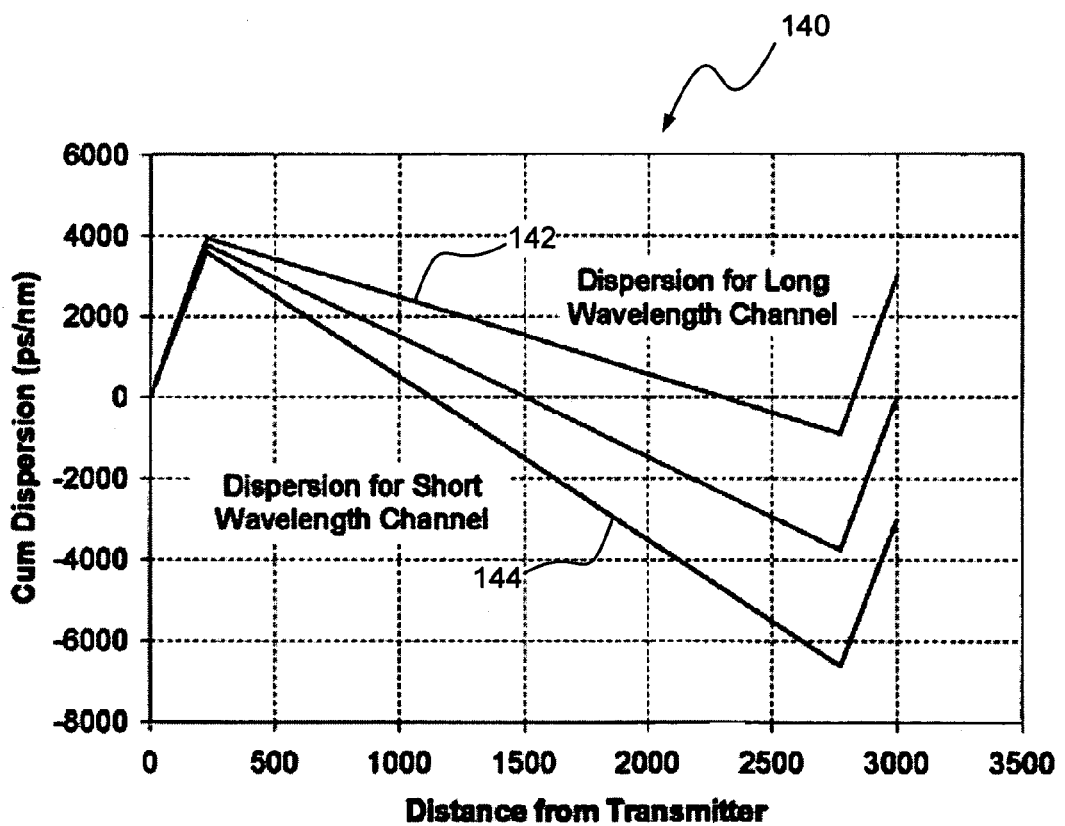
FIG. 3 is a graph showing accumulated dispersion as a function of distance and illustrating one example of a single period segment dispersion map corresponding to the segment dispersion shown in FIG. 2.

Referring to FIGS. 2 and 3, one example of a single period segment dispersion map designed with two fiber types provides for dispersion compensation at the ends of the segment. The two fiber types have different dispersion characteristics such as dispersion of opposite signs (i.e., positive dispersion and negative dispersion). The exemplary dispersion map may be created by arranging the two different fiber types in three fiber groupings or regions 130, 132, 134 with two transitions $X_1$, $X_2$ between the fiber types (FIG. 2). In one embodiment, a region 132 of non-zero dispersion shifted fiber (NZDSF) is located at the center and regions 130, 134 of non-dispersion shifted fiber (NDSF) are located at the ends to provide the dispersion compensation. The region 132 of NZDSF may include large mode area fiber (LMF) such as the type available from OFS and/or high dispersion fiber (HDF) such as the type available from OFS. The regions 130, 134 NDSF may include dispersion compensating fiber such as the type available from OFS. In one example, the NZDSF may have a dispersion of about −3 ps/nm and the NDSF may have a dispersion of about 17 ps/nm. Although the exemplary embodiments described herein use specific types of fibers, those skilled in the art will recognize that the dispersion mapping techniques consistent with the embodiments of the present invention may be implemented with other fiber types.

The locations of the transitions $X_1$, $X_2$ from one fiber type to the other may be chosen to yield relatively low net dispersion through the segment, for example, as illustrated in FIG. 3. In the illustrated embodiment with the center of the segment including the region 132 of NZDSF and the ends including the regions 130, 134 of NDSF, for example, low net dispersion exists when:

$$D_1 \times [X_1 + (L-X_2)] \approx -D_2 \times [X_2 - X_1]$$

where $D_1$ and $D_2$ are the dispersion values for the fiber types, $X_1$ and $X_2$ are the transition points between the fiber types and L is the length of the segment.

FIG. 3 shows one example of a single period segment dispersion map 140 where dispersion compensation occurs at the ends of the segments. In this exemplary dispersion map 140, the minimum dispersion wavelength ($\lambda_0$) is within the transmission band, for example, at the center wavelength. The dispersion map 140 also shows the dispersion for a long wavelength channel 142 and for a short wavelength channel 144. Although the dispersion map 140 shows dispersion for only one direction of transmission through a segment, the dispersion map 140 is essentially the same for the other direction of transmission. Although the illustrated dispersion map 140 is designed for a 3000 km segment, similar dispersion maps may be designed for other segment lengths.

Figure 4:
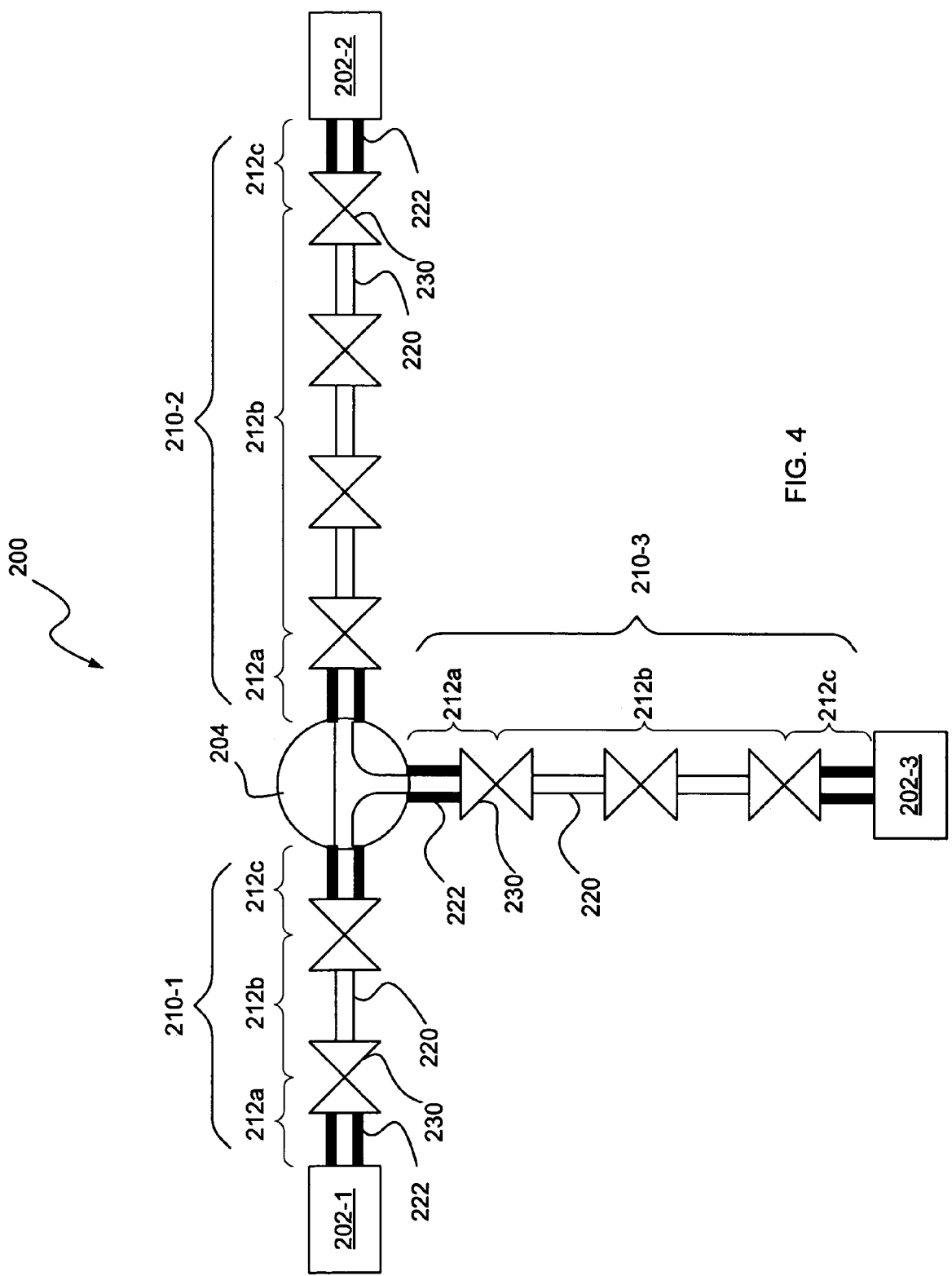
FIG. 4 is a schematic diagram of one embodiment of a branched optical network including transmission segments having a single period segment dispersion map with compensation at the ends.

FIG. 4 shows one embodiment of a branched optical network 200 including transmission segments 210-1 to 210-3 having a single period segment dispersion map with dispersion compensation at the ends of the segments 210-1 to 210-3. The transmission segments 210-1 to 210-3 may be coupled between one or more network nodes such as terminals 202-1 to 202-3 and branching unit 204. Each of the transmission segments 210-1 to 210-3 may include three concatenated sub-segments 212a, 212b, 212c, for example, corresponding to the three fiber regions 130, 132, 134 shown in FIG. 2. Each of the segments 210-1 to 210-3 may include one or more cable spans 220, 222. A span generally includes the fiber extending between optical amplifiers or repeaters 230.

In the exemplary embodiment, the spans 220, 222 have two different span designs and each of the sub-segments 212a, 212b, 212c includes one or more contiguous spans with a common span design. The span design refers to the choice of fiber types and lengths providing the optical path between the amplifiers or repeaters. In this embodiment, the spans 220 may include a length of non-zero dispersion shifted fiber (NZDSF), and the spans 222 may include a length of non-dispersion shifted fiber (NDSF). In this embodiment, the sub-segments 212a, 212b at the ends include the spans 222 with the NDSF and the sub-segments 312c at the middle include the spans 220 with the NZDSF. As discussed above, the spans 220, 222 may be designed with lengths of fiber to provide low net dispersion through the segments. According to one method of constructing the branched optical network 200, the compensation spans 222 may be placed around the branching unit 204 and the length of the compensation spans 222 may be trimmed to achieve the low net dispersion for each segment.

Figure 5:
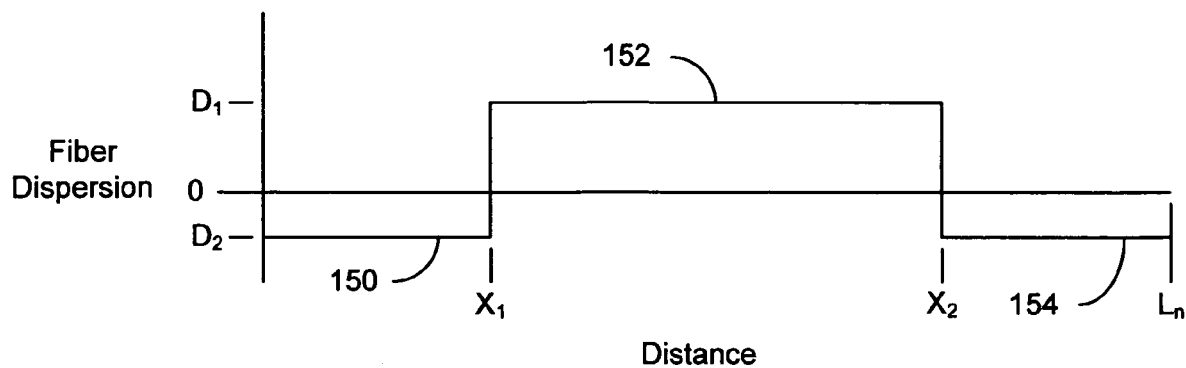
FIG. 5 is a graph illustrating the dispersion in a transmission segment having dispersion compensation in the middle, consistent with another embodiment of the present invention.
Figure 6:
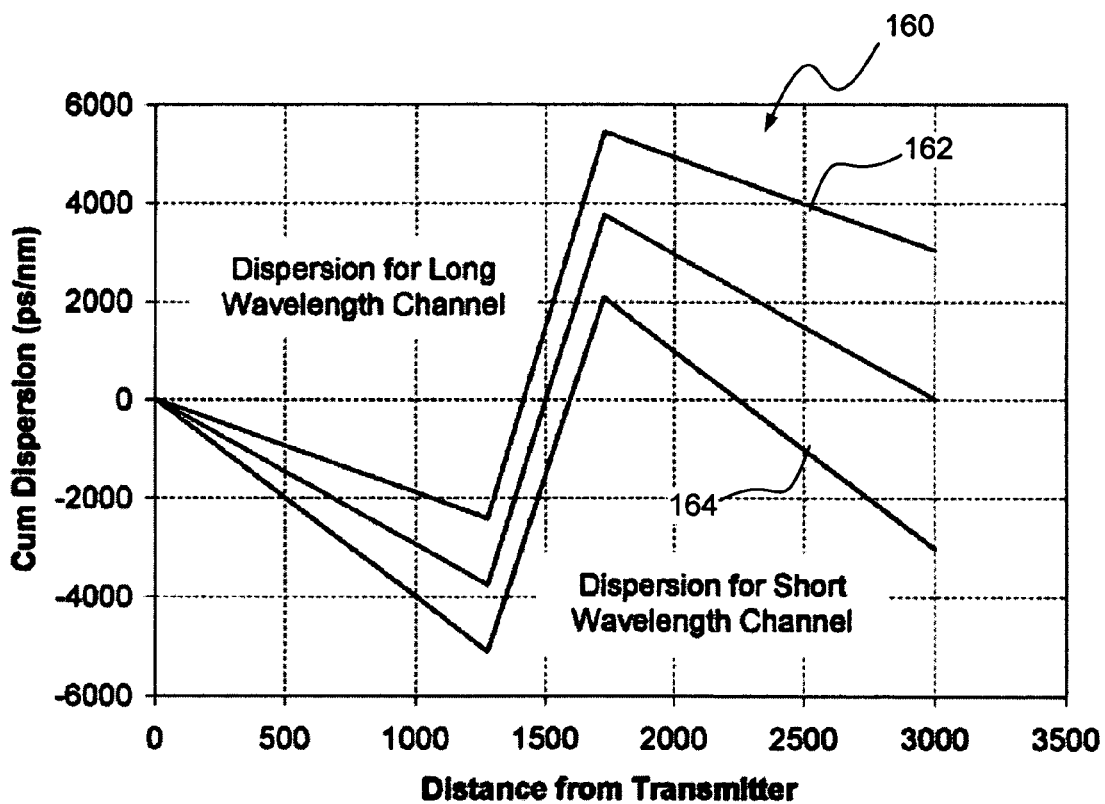
FIG. 6 is a graph showing accumulated dispersion as a function of distance and illustrating one example of a single period segment dispersion map corresponding to the segment dispersion shown in FIG. 5.

Referring to FIGS. 5 and 6, another example of a single period segment dispersion map designed with two fiber types provides for dispersion compensation at the middle of the segment. This embodiment may use the same fiber types discussed above with regions 150, 154 of NZDSF located at the ends and a region 152 of NDSF located at the center to provide the dispersion compensation. In the illustrated embodiment with the center of the segment including the region 152 of NDSF and the ends including the regions 150, 154 of NZDSF, low net dispersion exists when:

$$D_2 \times [X_1 + (L-X_2)] \approx D_1 \times [X_2 - X_1]$$

where $D_1$ and $D_2$ are the dispersion values for the fiber types, $X_1$ and $X_2$ are the transition points between the fiber types and L is the length of the segment.

FIG. 6 shows one example of a single period segment dispersion map 160 where dispersion compensation occurs at the middle of the segments. The dispersion map 160 also shows the dispersion for a long wavelength channel 162 and for a short wavelength channel 164. Although the dispersion map 160 shows dispersion for only one direction of transmission, the dispersion map 160 is essentially the same for the other direction of transmission. Although the illustrated dispersion map 160 is designed for a 3000 km segment, similar dispersion maps may be designed for other segment lengths.

Figure 7:
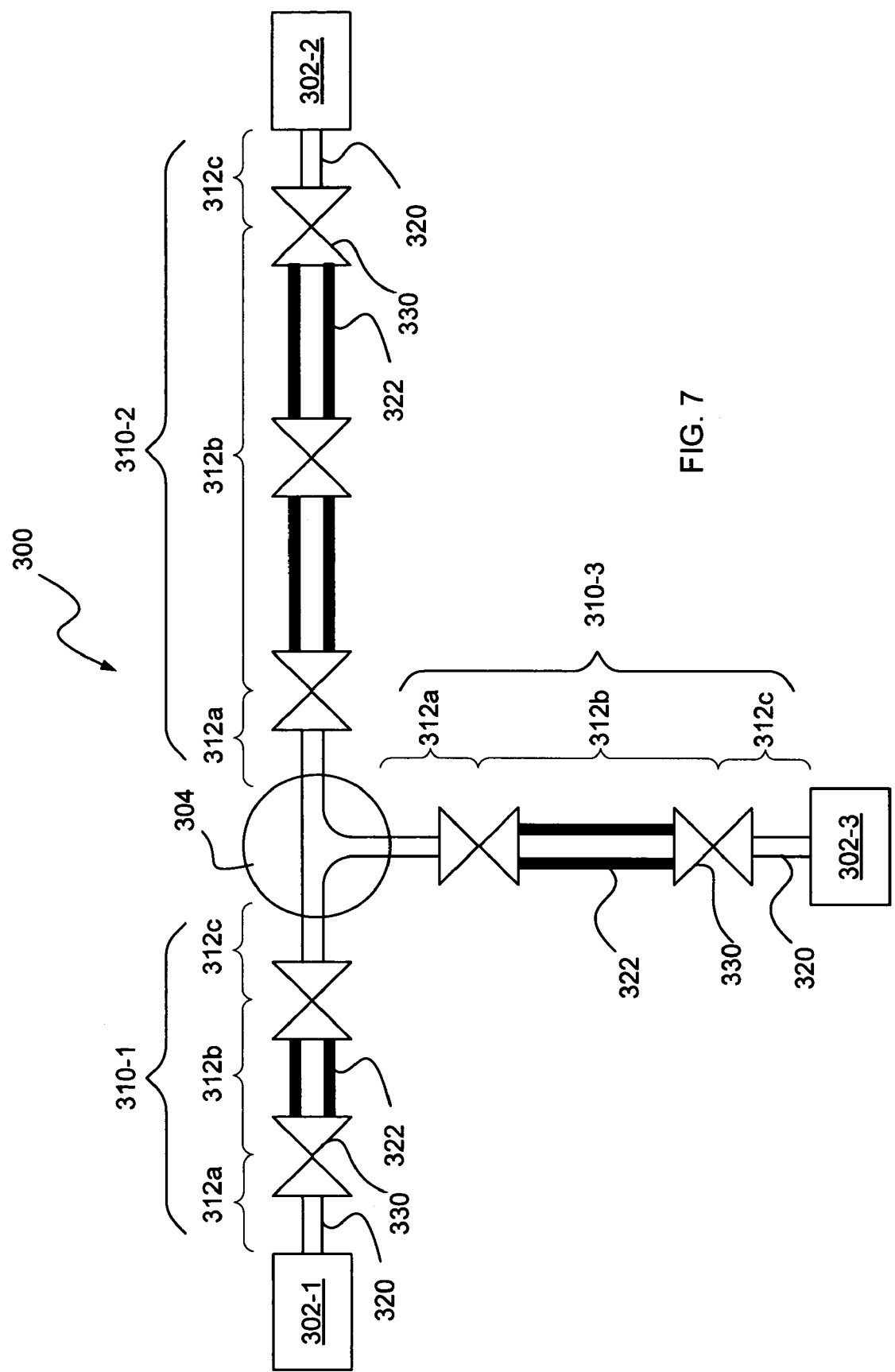
FIG. 7 is a schematic diagram of another embodiment of a branched optical network including transmission segments having the single period segment dispersion map with dispersion compensation in the middle of the segment.

FIG. 7 shows one embodiment of a branched optical network 300 including transmission segments.310-1 to 310-3 having a single period segment dispersion map with dispersion compensation at the middle of the segments 310-1 to 310-3. The transmission segments 310-1 to 310-3 may be coupled between one or more network nodes such as terminals 302-1 to 302-3 and branching unit 304. Each of the transmission segments 310-1 to 310-3 may include three concatenated sub-segments 312a, 312b, 312c, for example, corresponding to the three fiber regions 150, 152, 154 shown in FIG. 5. Each of the segments 310-1 to 310-3 may include one or more cable spans 320, 322 extending between optical amplifiers or repeaters 330. The spans 320, 322 used in this embodiment may be similar to the spans 220, 222 described above; however, the sub-segments 312a, 312c at the ends include the regular spans 320 with the NZDSF and the sub-segments 312b at the middle include the compensation spans 322 with the NDSF.

The exemplary transmission segments 210, 310 described above may be connected through branching units 204, 304 to form complex branched optical networks. The simplicity of the single period segment dispersion map allows dispersion management to be simplified in the branched optical networks. By implementing a symmetric single period segment dispersion map in the transmission segments 210, 310, the branched optical networks 200, 300 allow for similar transmission characteristics independent of the transmission direction and the path through the networks 200, 300. In other words, the symmetric single period dispersion map may be designed and implemented for each transmission segment with little regard for which segments will be concatenated for the full (i.e., terminal-to-terminal) fiber paths through the branched network. The ability to use only two span designs (or types of cable) and the grouping of fiber types in a minimum number of locations in the segment also simplifies construction and repairs in a branched optical network.

The low net dispersion of the segments 210, 310 enables any two or more transmission segments 210, 310 to be concatenated with minimum residual dispersion for all resulting paths simultaneously. The ability to provide low dispersion for every path through a branched network may reduce the cost for dispersion compensation in the terminals and may provide flexibility in configuring the network. Having a low value of net dispersion for every path through a branched network also simplifies the design of dynamically reconfigured networks or networks incorporating optical add/drop multiplexers (OADMs) at the branching units.

Although the exemplary embodiments of the segments 210, 310 may be constructed using only two span designs, those skilled in the art will recognize that additional span designs may also be used within a single segment. Also, more than three fiber groupings or regions or three sub-segments may be combined within a single segment to achieve low net dispersion in the segments 210, 310. Although the exemplary embodiments show all of the segments in the branched optical networks having the same dispersion map design, branched optical networks may include one or more segments with different dispersion maps.

Figure 8:
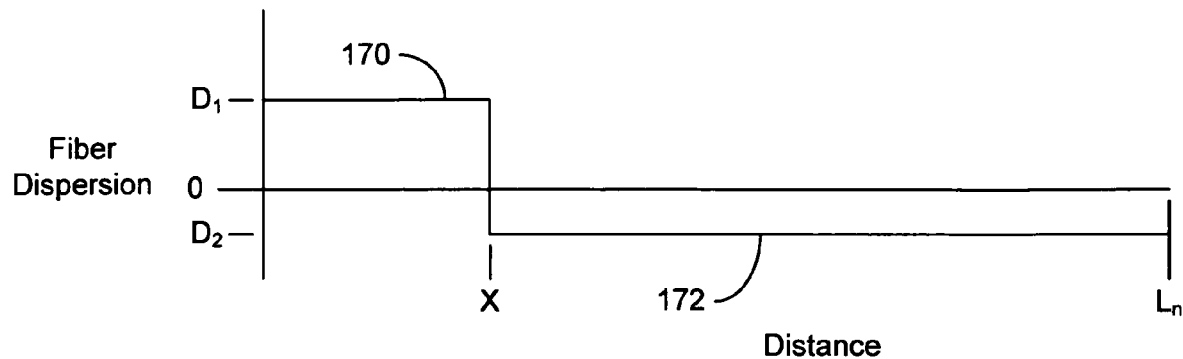
FIG. 8 is a graph illustrating the dispersion in a transmission segment with only two fiber groupings, consistent with a further embodiment of the present invention.
Figure 9:
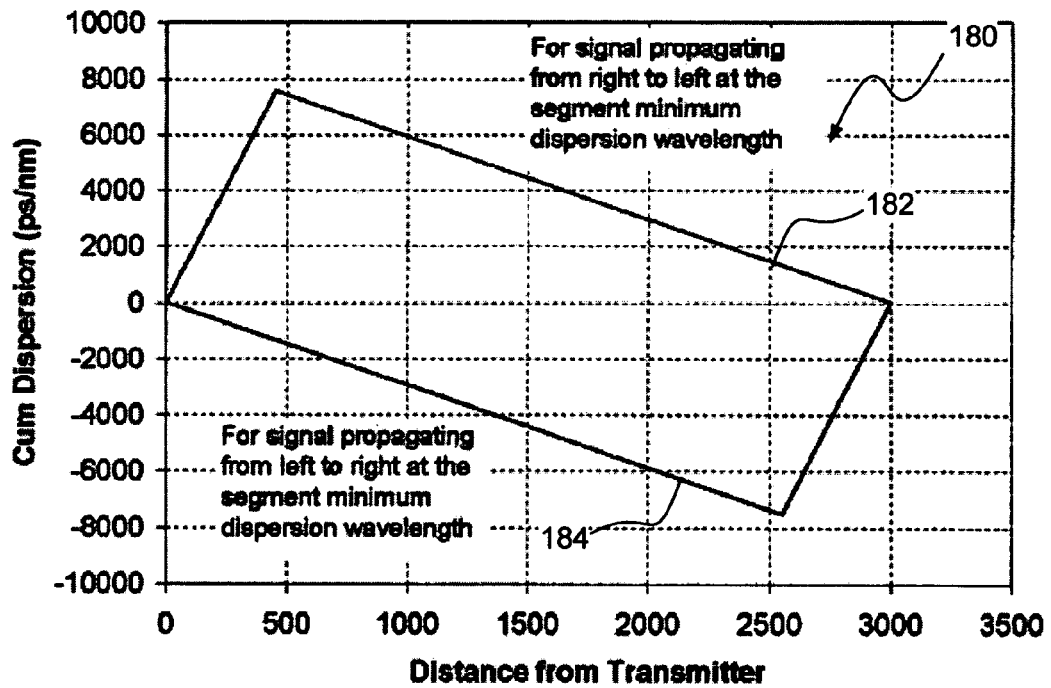
FIG. 9 is a graph showing accumulated dispersion as a function of distance and illustrating one example of a single period segment dispersion map corresponding to the segment dispersion shown in FIG. 8.

Referring to FIGS. 8 and 9, a further example of a single period segment dispersion map designed with two fiber types may include only two fiber groupings or regions 170, 172. The same fiber types may be used as described above with a region 170 of the NDSF located at one end of a segment and a region 172 of the NZDSF located at the other end of a segment. The position of the transition X from one fiber type to the other may be chosen to yield low net dispersion through the segment. In the illustrated embodiment, for example, low net dispersion exists when:

$$D_1 \times X \approx -D_s \times [L-X]$$

wherein $D_1$ and $D_2$ are the dispersion values of the fiber types, X is the position of the transition, and L is the length of the segment.

FIG. 9 shows one example of a single period dispersion map 180 formed by only two fiber groupings or regions. The dispersion map 180 is asymmetric and accumulated dispersion versus transmission distance through the segment is different for the two directions of transmission. This design may be used where the resulting transmission impairment is low enough to permit effective transmission through the segments and the network. For example, this asymmetric dispersion map may be used in single-segment networks, short segments (e.g., under 4,000 km), or in systems with a high Q-factor margin.

Figure 10:
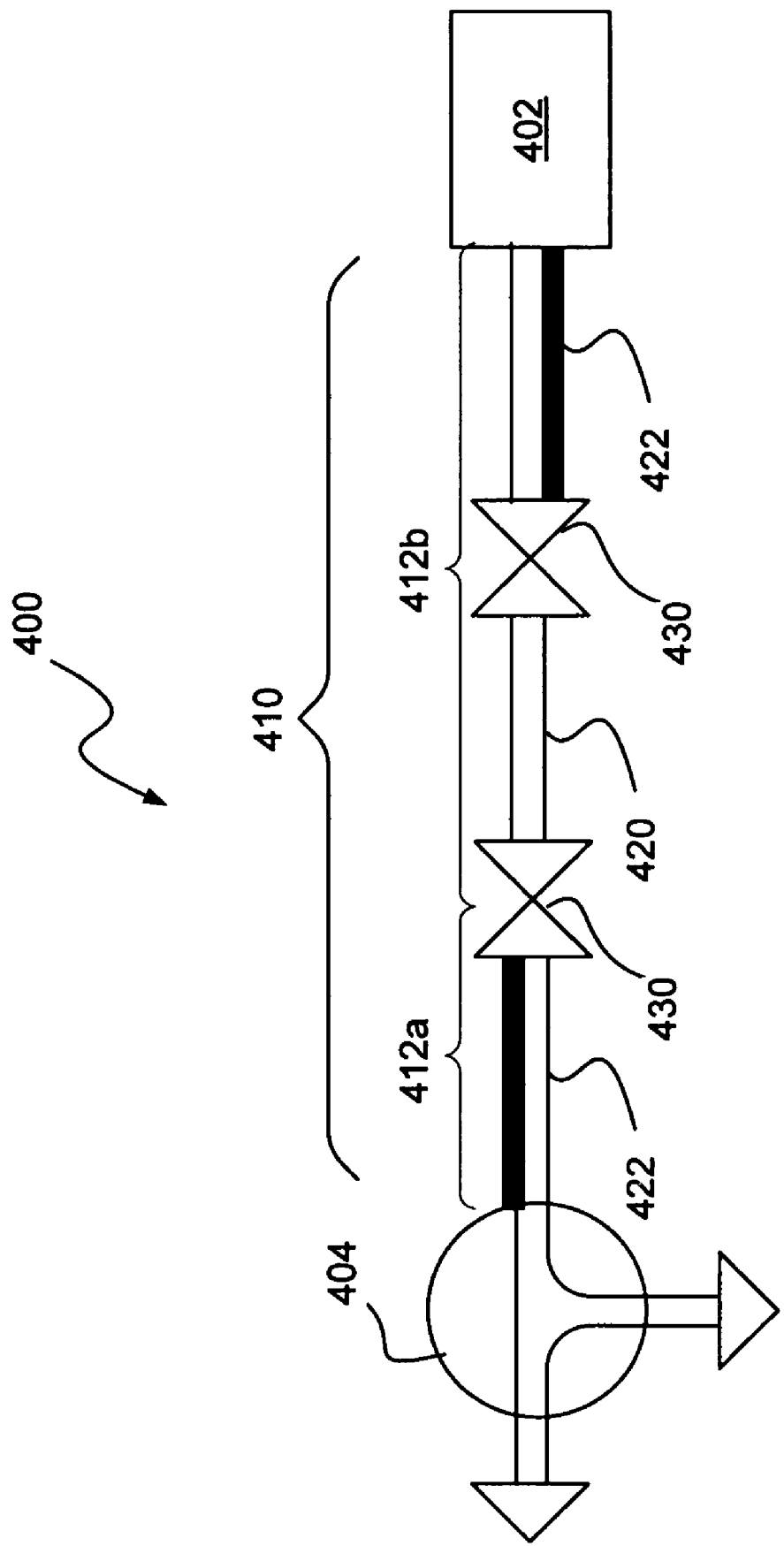
FIG. 10 is a schematic diagram of a further embodiment of a transmission segment having a single period segment dispersion map with only two fiber groupings.

FIG. 10 shows one embodiment of a transmission segment 410 having an asymmetric single period dispersion map with only two fiber groupings or regions. The segment 410 may be coupled between network nodes such as terminal 402 and branching unit 404 in a branched optical network 400. The segment 410 may include one or more spans 420, 422 coupled between repeaters 430 and arranged to form two sub-segments 412a, 412b (shown for the transmission direction from right to left) corresponding to the regions 170, 172 of positive and negative dispersion. To implement the dispersion map shown in FIG. 9, the spans 422 at the ends of the segment 410 may include both NZDSF and NDSF, providing dispersion compensation at the end of the segment in each direction. The spans 420 at the middle of the segment 410 may include only NZDSF.

Figure 11:
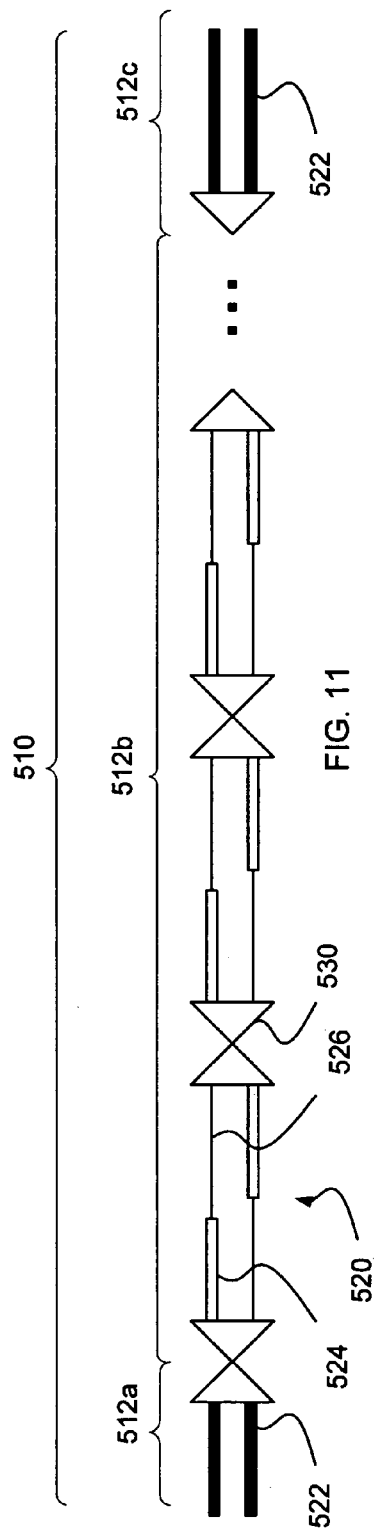
FIG. 11 is a schematic diagram of a transmission segment with spans of dispersion flattened fiber and compensating fiber, consistent with yet another embodiment of the present invention.
Figure 12:
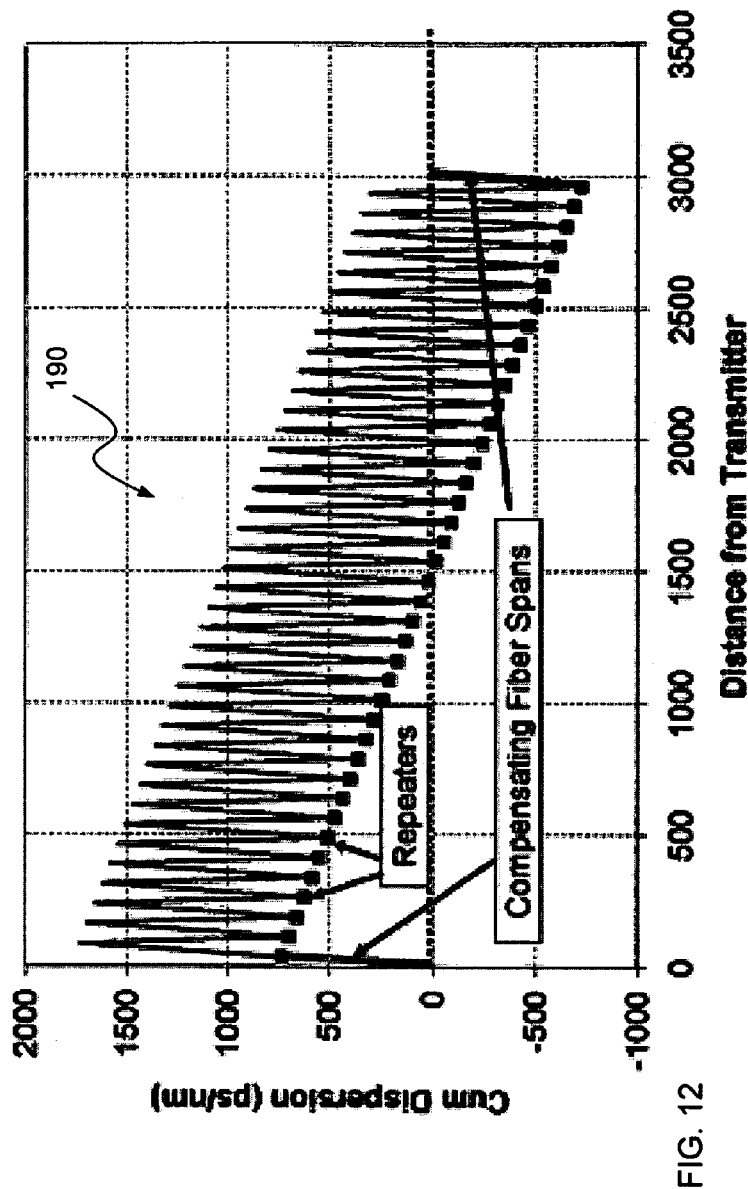
FIG. 12 is a graph showing accumulated dispersion as a function of distance and illustrating one example of a segment dispersion map for a segment using fiber spans with dispersion flattened fiber.

Referring to FIGS. 11 and 12, a transmission segment 510 may also be constructed using one or more spans 520 including dispersion flattened fiber (DFF) and one or more spans 522 including dispersion compensating fiber. The DFF spans 520 may be designed to yield a non-zero total dispersion in each span (e.g., about 0.3 ps/nm/km) and the accumulated dispersion is compensated by the compensating spans 522 before detection. In one embodiment, a sub-segment 512b at the middle of the segment 510 may include one or more DFF spans 520 and the sub-segments 512a, 512c at the ends of the segment 510 may include one or more compensating spans 522. Alternatively, the compensating span(s) 522 may be located in the middle of the segment 510.

In one embodiment, the DFF spans 520 may include dispersion-slope matched fiber. Each DFF span may include, for example, a section of positive dispersion fiber 524 such as the type available from OFS under the name Ultrawave SLA followed by a section of inverse or negative dispersion fiber 526 such as the type available from OFS under the name Ultrawave IDF. The length of negative dispersion fiber 526 may be slightly longer than the length needed to compensate for the dispersion accumulated in the positive dispersion fiber 524 of the span 520. As a result, each DFF span 520 contributes a net negative dispersion to the accumulated dispersion seen by signals traversing the segment 510.

FIG. 12 shows one example of a single period dispersion map 190 corresponding to the transmission segment 510 designed with DFF spans 520 at the middle and compensating spans 522 at the ends.

Although each of the exemplary branched optical networks described above use the same arrangement of spans for each of the transmission segments, a branched optical network may use different arrangements of spans and/or different dispersion maps for different transmission segments in the branched optical network. For example, a branched optical network may be constructed using a transmission segment of the type shown in FIG. 4, a transmission segment of the type shown in FIG. 7, a transmission segment of the type shown in FIG. 10, and/or a transmission segment of the type shown in FIG. 11.

Using the segment dispersion map consistent with embodiments of the present invention may advantageously avoid dispersion compensation in the transmitting and/or receiving terminals. Common dispersion compensation applied to all channels may be avoided regardless of the path through the branched network. Channel specific dispersion compensation may also be avoided, particularly when segments are constructed with dispersion flattened fiber (DFF). The amount of channel specific dispersion compensation may depend on the lengths of the concatenated segments defining each full path through the branched optical-network and the types of fibers used in each segment.

Dispersion management in a branched optical network using a single period segment dispersion map may also make it easier to implement channel-specific routing in the optical branched network. Using channel-specific routing, a WDM channel may be routed to more than one segment, for example, using an optical add/drop multiplexer (OADM). Using the single period segment dispersion map for the segments in the branched network, the dispersion map for every channel may be acceptable without dramatic corrective action (i.e., compensation) at the terminals. Similarly, the single period segment dispersion map also facilitates fiber switching or dynamic reconfiguration of channel routing at the branching units. Because every segment is capable of presenting low net dispersion to every channel through the segment, change in net dispersion for a channel may be minimized when the branching unit is reconfigured to change the segment connectivity or when an OADM changes the path taken for an individual WDM channel.

In summary, embodiments of the present invention provide dispersion management for branched optical networks. Consistent with one aspect of the present invention, a branched optical network includes a plurality of network nodes and a plurality of optical transmission segments extending from at least one of the network nodes. Each of the optical transmission segments comprises a plurality of fiber spans arranged to form at least two sub-segments. One of the sub-segments provides positive dispersion and another of the sub-segments provides negative dispersion such that each of the optical transmission segments has a single period segment dispersion map.

Consistent with another aspect of the present invention, a branched optical network includes a plurality of network nodes and a plurality of optical transmission segments extending from at least one of the network nodes. Each of the optical transmission segments includes at least one dispersion shifted fiber span and at least one dispersion compensating fiber span providing a single period dispersion map.

Consistent with another aspect of the present invention, a branched optical network includes a plurality of network nodes and a plurality of optical transmission segments extending from at least one of the network nodes. Each of the optical transmission segments comprises at least two different fiber types having two different dispersion characteristics. The two different fiber types are arranged in at least three regions of fiber having a common fiber type to provide a single period segment dispersion map.

Consistent with a further aspect of the present invention, a method is provided for constructing a branched optical network. A plurality of fiber spans are provided and a plurality of optical transmission segments are constructed from the fiber spans. The fiber spans are arranged to form at least two sub-segments, wherein one of the sub-segments provides positive dispersion and another of the sub-segments provides negative dispersion such that each of the optical transmission segments has a single period dispersion map. The optical transmission segments are coupled between network nodes. At least one of the network nodes is coupled to at least three of the transmission segments.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A branched optical network, comprising:
    a plurality of network nodes; and
    a plurality of optical transmission segments extending from said plurality of said network nodes, at least three of said optical transmission segments separately extending from one of said network nodes to three other respective ones of said network nodes such that said optical transmission segments provide a plurality of different optical paths branching in at least three different directions for data transmission, each of said optical transmission segments comprises a plurality of fiber spans arranged to form at least two sub-segments, wherein one of said sub-segments is configured to provide positive dispersion and another of said sub-segments is configured to provide negative dispersion such that each of said optical transmission segments has a single period segment dispersion map extending between said network nodes at ends of each of said optical transmission segments.

2. The branched optical network of claim 1 wherein at least one of said network nodes is a transmitting and receiving terminal configured to transmit optical signals using differential phase shift keying (DPSK) modulation.

3. The branched optical network of claim 1 wherein said nodes are selected from the group consisting of terminals and branching units, and wherein said one of said network nodes is a branching unit.

4. The branched optical network of claim 3 wherein at least three of said transmission segments are coupled directly to said branching unit.

5. The branched optical network of claim 1 wherein each of said transmission segments further comprises at least one optical amplifier between said fiber spans.

6. The branched optical network of claim 1 wherein each of said fiber spans in each of said transmission segments includes at least first and second fibers configured to transmit optical signals in first and second directions.

7. The branched optical network of claim 1 wherein said fibers spans are arranged in three sub-segments having a common fiber type to provide said single period segment dispersion map.

8. The branched optical network of claim 7 wherein said fiber spans are arranged to provide positive dispersion sub-segments at each end of said transmission segment and a negative dispersion sub-segment between said positive dispersion sub-segments.

9. The branched optical network of claim 7 wherein said fiber spans are arranged to provide negative dispersion sub-segments at each end of said transmission segment and a positive dispersion sub-segment between said negative dispersion sub-segments.

10. The branched optical network of claim 1 wherein said fiber spans are arranged to provide a negative dispersion sub-segment at one end of said transmission segment and a positive dispersion sub-segment at an opposite end of said transmission segment.

11. The branched optical network of claim 1 wherein at least one of said sub-segments providing positive dispersion includes at least one fiber span including non-dispersion shifted fiber (NDSF) fiber.

12. The branched optical network of claim 1 wherein at least one of said sub-segments providing negative dispersion includes at least one fiber span including non-zero dispersion shifted fiber (NZDSF).

13. The branched optical network of claim 1 wherein at least one of said sub-segments providing negative dispersion includes at least one fiber span including dispersion flattened fiber.

14. The branched optical network of claim 1 wherein at least one of said sub-segments providing negative dispersion includes at least one fiber span including a section of positive dispersion fiber and a section of negative dispersion fiber, wherein a length of said negative dispersion fiber is longer than the length needed to compensate for the dispersion accumulated in the positive dispersion fiber such that said negative dispersion fiber span has a net negative dispersion.

15. The branched optical network of claim 1 wherein said single period segment dispersion map is symmetric.

16. The branched optical network of claim 1 wherein said transmission segments are configured to transmit a plurality of optical signals at a plurality of wavelengths, and wherein a net end-to-end dispersion for each of said segments is about zero for at least one of said wavelengths.

17. The branched optical network of claim 16 wherein a net dispersion through each optical path through said transmission segments is about zero for at least one of said wavelengths.

18. The branched optical network of claim 1 wherein single period dispersion maps of at least two of said transmission segments are different.

19. A branched optical network, comprising:
    a plurality of network nodes; and
    a plurality of optical transmission segments extending from said plurality of network nodes, at least three of said optical transmission segments separately extending from one of said network nodes to three other respective ones of said network nodes such that said optical transmission segments provide a plurality of different optical paths branching in at least three different directions for data transmission, each of said optical transmission segments comprises at least one dispersion shifted fiber span and at least one dispersion compensating fiber span providing a single period segment dispersion map extending between said network nodes at ends of each of said optical transmission segments.

20. The branched optical network of claim 19 wherein said single period dispersion map is symmetric.

21. A branched optical network, comprising:
    a plurality of network nodes; and
    a plurality of optical transmission segments extending from said plurality of said network nodes, at least three of said optical transmission segments separately extending from one of said network nodes to three other respective ones of said network nodes such that said optical transmission segments provide a plurality of different optical paths branching in at least three different directions data transmission, each of said optical transmission segments comprising at least two different fiber types having two different dispersion characteristics, wherein said two different fiber types are arranged in at least three regions of fiber having a common fiber type to provide a symmetric single period segment dispersion map.

22. The branched optical network of claim 21 wherein one of said fiber types is a dispersion shifted fiber, and wherein another of said fiber types is a dispersion compensating fiber.

23. The branched optical network of claim 21 wherein one of said regions includes said dispersion shifted fiber at a middle of each of said transmission segments, and two of said regions includes said dispersion compensating fiber at ends of said transmission segments.

24. The branched optical network of claim 21 wherein one of said regions includes said dispersion compensating fiber at a middle of each of said transmission segments, and two of said regions includes said dispersion shifted fiber at ends of said transmission segments.

25. A method for constructing a branched optical network, comprising:

providing a plurality of fiber spans;

providing a plurality of network nodes;

constructing a plurality of optical transmission segments from said fiber spans, wherein said fiber spans are arranged to form at least two sub-segments, wherein one of said sub-segments provides positive dispersion and another of said sub-segments provides negative dispersion such that each of said optical transmission segments has a single period segment dispersion map extending between said network nodes at ends of each of said optical transmission segments; and coupling said optical transmission segments between network nodes, wherein at least one of said network nodes is coupled to at least three of said transmission segments such that said at least three of said transmission segments extend separately from said at least one of said network nodes and branch in at least three different directions.

26. The method of claim 25 wherein single period dispersion maps of at least two of said transmission segments are different.

* * * * *

UNITED STATES PATENT AND TRADEMARK OFFICE
CERTIFICATE OF CORRECTION

PATENT NO. : 7,426,323 B2
APPLICATION NO. : 11/350265
DATED : September 16, 2008
INVENTOR(S) : Stuart M. Abbott, Ekaterina A. Golovchenko and Michael Vaa It is certified that error appears in the above-identified patent and that said Letters Patent is hereby corrected as shown below:

In column 3, line 3, delete "110-6" and insert --110-5--.

In column 3, line 4, delete "110-6" and insert --110-5--.

In column 5, line 17, delete "212$b$" and insert --212$c$--.

In column 5, line 18, delete "312$c$" and insert --212$b$--.

In column 6, line 55, delete "$D_1 \times X - D_s \times [L - X]$" and insert --$D_1 \times X - D_2 \times [L - X]$--.

Signed and Sealed this

Ninth Day of March, 2010

David J. Kappos
*Director of the United States Patent and Trademark Office*